US012712454B2

(12) United States Patent
Wang et al.

(10) Patent No.: US 12,712,454 B2
(45) Date of Patent: Aug. 18, 2026

(54) SWITCH POWER SUPPLY CIRCUIT AND TERMINAL DEVICE

(71) Applicant: Honor Device Co., Ltd., Shenzhen (CN)

(72) Inventors: Chao Wang, Shenzhen (CN); Qing Ji, Shenzhen (CN)

(73) Assignee: Honor Device Co., Ltd., Shenzhen (CN)

(*) Notice: Subject to any disclaimer, the term of this patent is extended or adjusted under 35 U.S.C. 154(b) by 107 days.

(21) Appl. No.: 18/724,858

(22) PCT Filed: Dec. 14, 2022

(86) PCT No.: PCT/CN2022/139076
§ 371 (c)(1),
(2) Date: Jun. 27, 2024

(87) PCT Pub. No.: WO2023/134381
PCT Pub. Date: Jul. 20, 2023

(65) Prior Publication Data

US 2025/0105738 A1 Mar. 27, 2025

(30) Foreign Application Priority Data

Jan. 14, 2022 (CN) ......................... 202210041695.2

(51) Int. Cl.
*H02M 3/158* (2006.01)

(52) U.S. Cl.
CPC .................................. *H02M 3/158* (2013.01)

(58) Field of Classification Search
CPC .................................................... H02M 3/158
See application file for complete search history.

(56) References Cited

U.S. PATENT DOCUMENTS 5,430,366 A 7/1995 Erckert et al.
6,023,158 A * 2/2000 Liu ........................ H02M 1/34 323/299

(Continued)

FOREIGN PATENT DOCUMENTS

CN 203086358 U 7/2013
CN 104578772 A 4/2015

(Continued)

OTHER PUBLICATIONS

Ed Lipiansky, "Common Source (CS) Configuration" In: "Electrical, Electronics, and Digital Hardware Essentials for Scientists and Engineers," John Wiley & Sons, U.S.A., XP093243227, ISBN: 978-1-118-41452-1, pp. 434-437 (Dec. 27, 2012).

*Primary Examiner* — Rafael O De Leon Domenech
(74) *Attorney, Agent, or Firm* — Leydig, Voit & Mayer, Ltd.

(57) ABSTRACT

This application provides a switch power supply circuit and a terminal device, and the switch power supply circuit uses a second switch transistor to replace a diode in an asynchronous switch power supply circuit. A turn-on impedance of the switch transistor is very small, only tens of milliohms, so that a turn-on voltage drop in the switch power supply circuit is reduced from hundreds of millivolts to tens of millivolts, power loss of the switch power supply circuit is greatly reduced, and output efficiency is improved. Moreover, this solution uses a discrete component to form a control circuit to control a switch status of the second switch transistor without additionally setting a pulse width modulation (PWM) controller, and costs of the discrete component are far lower than costs of the PWM controller, reducing hardware costs of a switch power supply and simplifying a circuit design.

19 Claims, 5 Drawing Sheets

(56) References Cited

U.S. PATENT DOCUMENTS

| | | | | |
|---|---|---|---|---|
| 10,992,236 | B2 | 4/2021 | Telefus et al. | |
| 2005/0206323 | A1* | 9/2005 | Hayakawa | H02M 3/158<br>315/209 R |
| 2016/0028220 | A1* | 1/2016 | Sun | H02H 3/202<br>361/87 |
| 2021/0249956 | A1* | 8/2021 | Chan | H02M 3/156 |
| 2021/0265911 | A1* | 8/2021 | D'Souza | H03F 3/185 |
| 2022/0416535 | A1* | 12/2022 | Gayondato | H02H 9/025 |

FOREIGN PATENT DOCUMENTS

| | | | |
|---|---|---|---|
| CN | 106505847 | A | 3/2017 |
| CN | 108649792 | A | 10/2018 |
| CN | 110391736 | A | 10/2019 |
| CN | 114679055 | A | 6/2022 |

* cited by examiner

Q2
L1
Vout
+
Q1
Vin
Co
$R_L$
—

SWITCH POWER SUPPLY CIRCUIT AND TERMINAL DEVICE

CROSS-REFERENCE TO RELATED APPLICATIONS

This application is a national stage of International Application No. PCT/CN2022/139076, filed on Dec. 14, 2022, which claims priority to Chinese Patent Application No. 202210041695.2, filed on Jan. 14, 2022. The disclosures of both of the aforementioned applications are hereby incorporated by reference in their entireties.

TECHNICAL FIELD

This application relates to the field of power electronics technologies, and in particular, to a switch power supply circuit and a terminal device.

BACKGROUND

A switch power supply utilizes the modern power electronics technology to control a time ratio of turning on and turning off of a switch crystal UAN to maintain a stable output voltage. The switch power supply usually includes a pulse width modulation (PWM) control integrated circuit (IC) chip and a metal-oxide-semiconductor field-effect transistor (MOSFET). For example, common switch power supply circuits include boost circuits, buck circuits, and the like.

However, some switch power supply circuits have problems of large loss and low working efficiency.

SUMMARY

In view of this, this application provides a switch power supply circuit and a terminal device, to resolve the foregoing technical problems, and a technical solution disclosed in this application is as follows:

In a first aspect, this application provides a boost switch power supply circuit. The boost switch power supply circuit includes a first inductor, a first switch transistor, a second switch transistor, a control circuit and an output capacitor, where one end of the first inductor is connected to a positive input end of the boost switch power supply circuit, and the other end of the first inductor is connected to a first end of the first switch transistor; a second end of the first switch transistor is connected to a ground end, and a control end of the first switch transistor is connected to a drive signal controller; a first end of the second switch transistor is connected to a public node of the first inductor and the first switch transistor, a second end of the second switch transistor is connected to a positive output end of the boost switch power supply circuit, and a control end of the second switch transistor is connected to the control circuit; the control circuit includes a first voltage divider circuit and a second voltage divider circuit, and outputs a control signal for controlling a switch status of the second switch transistor; the first voltage divider circuit is connected in parallel between the first end and the second end of the first switch transistor; the second voltage divider circuit is connected between the second end of the second switch transistor and the ground end, the second voltage divider circuit includes at least two resistors connected in series, and a third switch transistor connected in series between the at least two resistors, a first end of the third switch transistor is connected to the control end of the second switch transistor, and a control end of the third switch transistor is connected to a middle node of the first voltage divider circuit; and the output capacitor is connected in parallel between the positive output end and the ground end. This solution uses a second switch transistor to replace a diode in an asynchronous boost switch power supply circuit. A turn-on voltage drop of the switch transistor is far lower than a turn-on voltage drop of the diode, reducing power loss of the boost switch power supply circuit. Moreover, the control circuit of the second switch transistor includes a discrete component, and finally implements that the second switch transistor is turned off when the first switch transistor (that is, a main loop switch transistor) is turned on, and the second switch transistor is turned on when the first switch transistor is turned off. Costs of the discrete component are far lower than costs of a PWM controller, and therefore the control circuit that includes the discrete component reduces hardware costs of the boost switch power supply circuit, and simplifies a circuit design of the boost switch power supply circuit.

In a possible implementation of the first aspect, the first voltage divider circuit includes at least two resistors connected in series.

In another possible implementation of the first aspect, the first voltage divider circuit includes a first resistor and a second resistor connected in series, and a public node of the first resistor and the second resistor is the middle node of the first voltage divider circuit.

In still another possible implementation of the first aspect, the second voltage divider circuit includes a third resistor and a fourth resistor connected in series, and a third switch transistor connected in series between the third resistor and the fourth resistor; and a first end of the third switch transistor is connected to the third resistor, a second end of the third switch transistor is connected to the fourth resistor, a control end of the third switch transistor is connected to the middle node of the first voltage divider circuit, and the first end of the third switch transistor is further connected to the control end of the second switch transistor. It can be learned that the first voltage divider circuit of this solution generates a control signal for controlling, based on a voltage at an SW node on an input end main loop, the third switch transistor in the second voltage divider circuit to be turned on and turned off, and further, the second voltage divider circuit provides a control signal for the second switch transistor to be turned on and turned off. Therefore, the control circuit that includes the discrete component controls the second switch transistor to be turned on and turned off, reducing hardware costs of the boost switch power supply circuit.

In yet still another possible implementation of the first aspect, the first switch transistor, the second switch transistor and the third switch transistor each are a metal-oxide-semiconductor field-effect transistor MOS transistor; and the first end is a drain of the MOS transistor, the second end is a source of the MOS transistor, and the control end is a gate of the MOS transistor.

In yet another possible implementation of the first aspect, the first switch transistor and the third switch transistor each are an NMOS transistor, and the second switch transistor is a PMOS transistor.

In a second aspect, this application provides a buck switch power supply circuit. The buck switch power supply circuit includes a first inductor, a first switch transistor, a second switch transistor, a control circuit and an output capacitor, where a first end of the first switch transistor is connected to a positive input end of the buck switch power supply circuit, a second end of the first switch transistor is connected to one end of the first inductor, and a control end of the first switch transistor is connected to a drive signal controller; the other end of the first inductor is connected to a positive output end of the buck switch power supply circuit; a first end of the second switch transistor is connected to a first public node of the first switch transistor and the first inductor, a second end of the second switch transistor is connected to a ground end, and a control end of the second switch transistor is connected to the control circuit; the control circuit includes a first voltage divider circuit and a second voltage divider circuit, and outputs a control signal for controlling a switch status of the second switch transistor; the first voltage divider circuit is connected in parallel between the first end and the second end of the second switch transistor; the second voltage divider circuit is connected between the other end of the first inductor and the ground end, the second voltage divider circuit includes at least two resistors connected in series, and a third switch transistor connected in series between the at least two resistors, a first end of the third switch transistor is connected to the control end of the second switch transistor, and a control end of the third switch transistor is connected to a middle node of the first voltage divider circuit; and the output capacitor is connected in parallel between the positive output end and the ground end. It can be learned that in the buck switch power supply circuit, the second switch transistor is used to replace a freewheeling diode. A turn-on impedance of the switch transistor is very small, only tens of milliohms, and a freewheeling current is usually a few amperes. Therefore, a turn-on voltage drop of the second switch transistor is tens of millivolts, but a turn-on voltage drop of the freewheeling diode is several hundred millivolts. Based on this, after the switch transistor is used to replace the freewheeling diode, power loss of the buck switch power supply circuit is greatly reduced, and output efficiency is improved. Moreover, in this solution, the control circuit that includes the discrete component controls the on and off states of the second switch transistor, so that when the first switch transistor is turned on, the second switch transistor is turned off; or when the first switch transistor is turned off, the second switch transistor is turned on. That is, this solution does not need to additionally set a PWM controller, costs of the discrete component are far lower than costs of the PWM controller, so that hardware costs of the buck switch power supply circuit are reduced, and a circuit design is simplified.

In a possible implementation of the second aspect, the first voltage divider circuit includes a first resistor and a second resistor, and the first resistor and the second resistor; and a public node of the first resistor and the second resistor is the middle node of the first voltage divider circuit.

In another possible implementation of the second aspect, the second voltage divider circuit includes a third resistor and a fourth resistor connected in series, and a third switch transistor connected in series between the third resistor and the fourth resistor; and a first end of the third switch transistor is connected to the third resistor, a second end of the third switch transistor is connected to the fourth resistor, a control end of the third switch transistor is connected to the middle node of the first voltage divider circuit, and the first end of the third switch transistor is further connected to the control end of the second switch transistor.

In still another possible implementation of the second aspect, the first switch transistor, the second switch transistor and the third switch transistor each are a metal-oxide-semiconductor field-effect transistor MOS transistor; and the first end is a drain of the MOS transistor, the second end is a source of the MOS transistor, and the control end is a gate of the MOS transistor.

In yet still another possible implementation of the second aspect, the first switch transistor, the second switch transistor, and the third switch transistor each are an NMOS transistor.

According to a third aspect, this application further provides a terminal device. The terminal device includes the boost switch power supply circuit according to any one of the implementations of the first aspect or the buck switch power supply circuit according to any one of the implementations of the second aspect; and the boost switch power supply circuit or the buck switch power supply circuit is configured to supply power to a to-be-powered module in the terminal device, and the to-be-powered module includes a speaker power amplifier or an LCD backlight module.

It should be understood that descriptions of technical features, technical solutions, beneficial effects, or similar statements in this application do not imply that all features and advantages can be implemented in any single embodiment. On the contrary, it may be understood that descriptions of the features or the beneficial effects mean that at least one embodiment includes a specific technical feature, technical solution, or beneficial effect. Therefore, the descriptions of the technical features, the technical solutions, or the beneficial effects in this specification may not necessarily be specific to a same embodiment. The technical features, technical solutions, or beneficial effects described in embodiments may be further combined in any proper manner. A person skilled in the art may understand that a specific embodiment may be implemented without using one or more specific technical features, technical solutions, or beneficial effects of the embodiment. In other embodiments, additional technical features and beneficial effects may further be identified in a specific embodiment that does not reflect all the embodiments.

BRIEF DESCRIPTION OF DRAWINGS

To describe the technical solutions in embodiments of the present disclosure or in the prior art more clearly, the following briefly describes the accompanying drawings required for describing the embodiments or the prior art. The accompanying drawings in the following description show merely some embodiments of the present disclosure, and a person of ordinary skill in the art may still derive other drawings from these accompanying drawings without creative efforts.

DESCRIPTION OF EMBODIMENTS

In this specification, the claims, and the brief description of drawings of this application, the terms "first", "second", "third", and the like are intended to distinguish between different objects but do not limit a particular order.

In embodiments of this application, the word "example" or "for example" is used to represent giving an example, an illustration, or a description. Any embodiment or design solution described by using "as an example" or "for example" in this application should not be explained as being more preferred or having more advantages than another embodiment or design solution. To be precise, the terms, such as "as an example" or "for example", are intended to present a related concept in a specific manner.

A switch power supply circuit includes a synchronous switch power supply circuit and an asynchronous switch power supply circuit, for example, a synchronous boost circuit, an asynchronous boost circuit, a synchronous buck circuit and an asynchronous buck circuit. Compared with the synchronous switch power supply circuit, the asynchronous boost circuit and the asynchronous buck circuit are connected with the output end through the diode, and the asynchronous switch power supply circuit is simple in circuit structure and control logic, so that the asynchronous switch power supply circuit is widely used.

However, the inventor of this application finds in research that power loss of the asynchronous switch power supply circuit is large, and working efficiency is low.

Figures 1A, 1B:
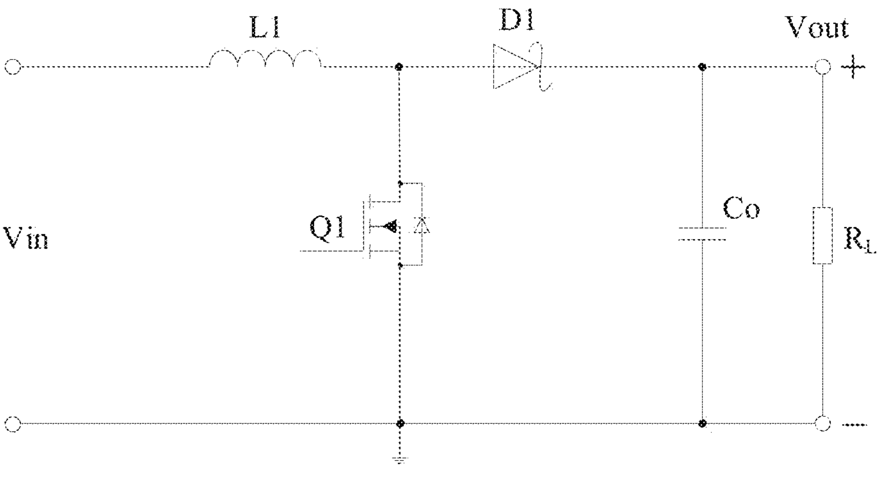
FIG. 1A is a schematic circuit principle diagram of an asynchronous boost circuit.
FIG. 1B is a schematic circuit principle diagram of a synchronous boost circuit.

For example, in an asynchronous boost circuit shown in FIG. 1A, an inductor L1 and a first switch transistor Q1 are connected in series and then connected in parallel with an input power supply Vin, and one end at which L1 and Q1 are connected is further connected to a positive output end through a diode D1.

When Q1 is turned on, the input power supply Vin and L1 form a closed loop, and L1 stores energy, and at this time D1 is reverse biased and is in an off state. When Q1 is turned off, a left-negative and right-positive induced voltage is generated in L1 because a current of the inductor L1 cannot be changed sharply, and the induced voltage is superimposed on the input power supply. At this time, D1 is forward biased and turned on, and the input power supply and the induced voltage form a loop through D1 and a load. Since a turn-on voltage of D1 is high, power loss of the asynchronous boost circuit is large, and working efficiency is low.

If a synchronous boost circuit is adopted, as shown in FIG. 1B, difference from FIG. 1A is that D1 on an output main loop is replaced with a second switch transistor Q2. However, Q1 and a PWM control IC of Q1 are usually integrated in a switch power supply chip, and cannot provide a control signal to the outside, in other words, a switch status of Q2 cannot be controlled by the PWM control IC of Q1. Therefore, use of a synchronous boost circuit requires an additional PWM controller (that is, a PWM control IC) to control turning on and turning off of Q2, resulting in an increase in hardware costs.

In order to solve the above technical problems, the inventor proposes the switch power supply circuit of this application, and uses a second switch transistor to replace the diode in the asynchronous switch power supply circuit. A turn-on voltage drop of the switch transistor is far lower than a turn-on voltage drop of the diode, reducing power loss of the switch power supply circuit. In addition, a control circuit that includes a discrete component controls on and off states of the second switch transistor, so that when a first switch transistor (that is, a main loop switch transistor) is turned on, the second switch transistor is turned off, or when the first switch transistor is turned off, the second switch transistor is turned on. Costs of the discrete component are far lower than costs of a PWM controller, and therefore the control circuit that includes the discrete component reduces hardware costs of the switch power supply circuit, and simplifies a circuit design of the switch power supply circuit.

A circuit structure and a working process of the switch power supply circuit based on an asynchronous boost circuit provided in this application are described below with reference to FIG. 2 to FIG. 5.

Figure 2:
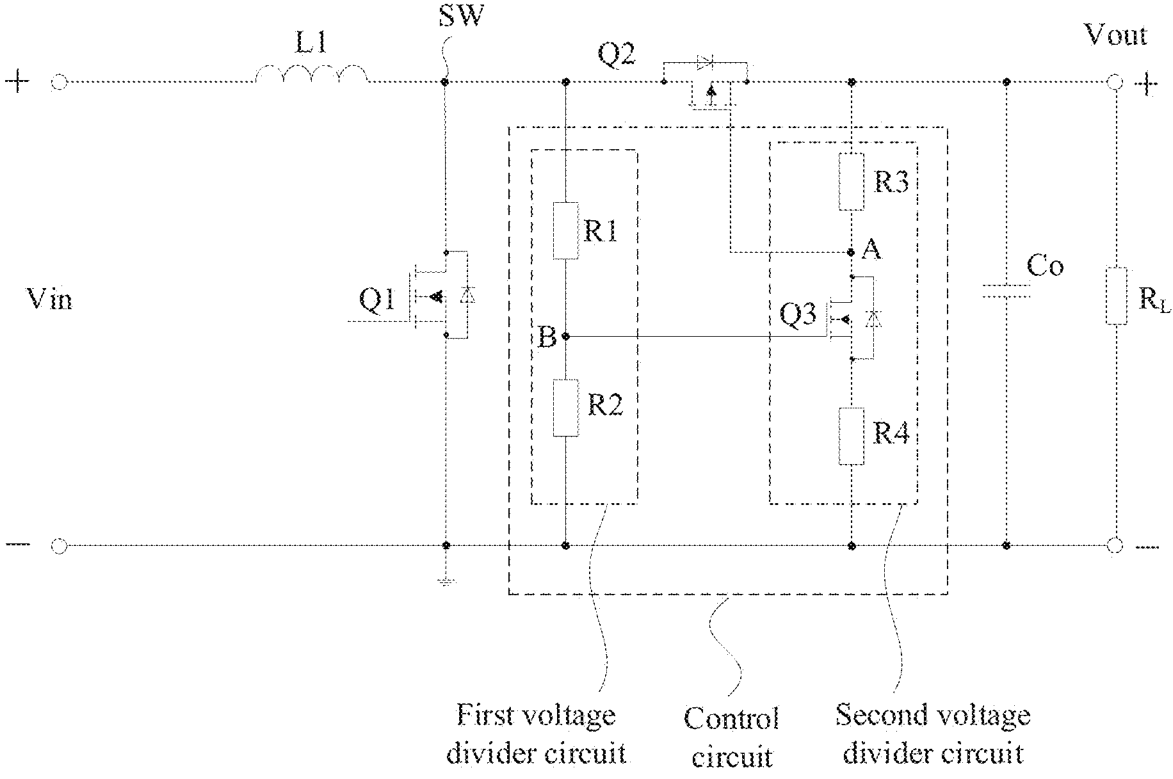
FIG. 2 is a schematic circuit principle diagram of a boost switch power supply according to an embodiment of this application.

FIG. 2 is a schematic circuit principle diagram of a boost switch power supply according to an embodiment of this application. As shown in FIG. 2, the boost switch power supply circuit includes an inductor L1, a first switch transistor Q1, a second switch transistor Q2, an output capacitor Co, a load $R_L$, and a control circuit.

The inductor L1 is connected to an input power supply Vin in parallel after being connected in series to the first switch transistor Q1, one end of L1 is connected to a positive electrode of the input power supply Vin, the other end of L1 is connected to a first end of Q1, a second end of Q1 is connected to a negative electrode of Vin, and a control end of Q1 is connected to a PWM controller.

A first end of the second switch transistor Q2 is connected to a public node SW of L1 and Q1, and a second end of the second switch transistor Q2 is connected to a positive output end of the switch power supply (that is, a positive electrode of an output power supply), and a control end of Q2 is connected to the control circuit.

The output capacitor Co is connected in parallel between the positive output end and GND for filtering an output voltage Vout to ensure stability of output voltage.

The control circuit includes a first voltage divider circuit and a second voltage divider circuit. The first voltage divider circuit is connected in parallel between the first end and the second end of Q1, and is configured to divide a voltage of the node SW to ground (GND). The second voltage divider circuit is connected in parallel to the output capacitor Co, that is, in parallel to the output side Vout, and is configured to provide a control voltage for controlling Q2 to be turned on and turned off.

The first voltage divider circuit includes at least two voltage divider resistors connected in series as shown in FIG. 2, and may include R1 and R2 connected in series. A public node A of R1 and R2 is connected to the second voltage divider circuit.

The second voltage divider circuit includes at least two voltage divider resistors and a switch transistor. For example, as shown in FIG. 2, the second voltage divider circuit may include resistors R3, R4, and a third switch transistor Q3. A first end and a second end of Q3 are connected in series between R3 and R4, and a control end of Q3 is connected to the public node A of the first voltage divider circuit. Moreover, the public node A at which the first end of Q3 is connected to R3 is connected to a control end of Q2.

In an example embodiment, as shown in FIG. 2, Q1 is an NMOS transistor, and Q2 is a PMOS transistor. The first end, the second end and the control end of Q1 and Q2 each are sequentially a drain, a source and a gate of an NMOS transistor.

In other embodiments of this application, Q1 may use other types of switch transistors, and similarly, Q2 may alternatively use other types of switch transistors, and types of Q1 and Q2 are not specifically limited in this application.

In other embodiments of this application, there may be more than two, for example, three or more voltage divider resistors in the first voltage divider circuit, and similarly, there may be more than two, for example, three or more voltage divider circuits in the second voltage divider circuit. The quantity of the voltage divider resistors in the first voltage divider circuit and the second voltage divider circuit each and a resistance value of each resistor may be determined based on actual conditions.

Working processes of the boost switch power supply in different stages provided in embodiments of this application will be described below with reference to FIG. 3 and FIG. 4.

(1) Energy Storage Stage of the Inductor L1

Figure 3:
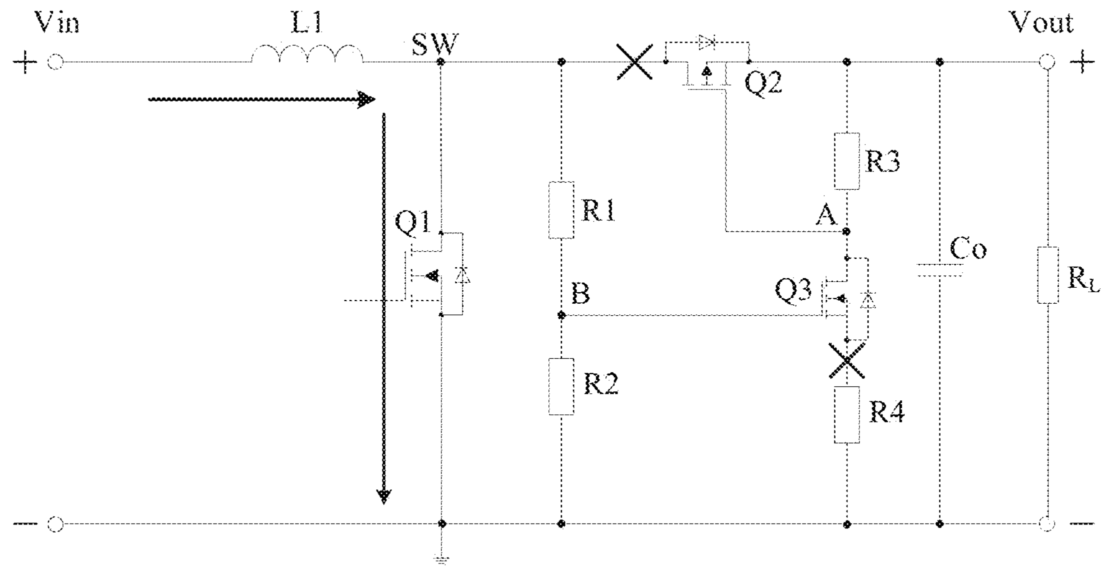
FIG. 3 is a schematic diagram of a current direction corresponding to an inductor energy storage stage of the boost switch power supply shown in FIG. 2.

Refer to FIG. 3. Q1 is in an on state. The input power supply Vin forms a closed loop through the inductor L1 and Q1, and since the inductor L1 has a characteristic of allowing passing through of a direct current while blocking an alternating current, a current is generated in the closed loop. L1 converts electric energy into magnetic energy for storage, and a current direction is shown by an arrow in FIG. 3.

At the same time, since Q1 is turned on, and the SW node is at an equal potential as GND, there is no current in the first voltage divider circuit, that is, a voltage of a node B is 0 V. A gate voltage of Q3 is 0 V, and Q3 is in an off state. Q3 is in the off state, so that a positive electrode voltage of the node A is equal to a positive electrode voltage of Vout, that is, a voltage of the gate and a voltage of the source of Q2 is equal, and Q2 is in an off state.

(2) Discharge Stage of the Inductor L1

Figure 4:
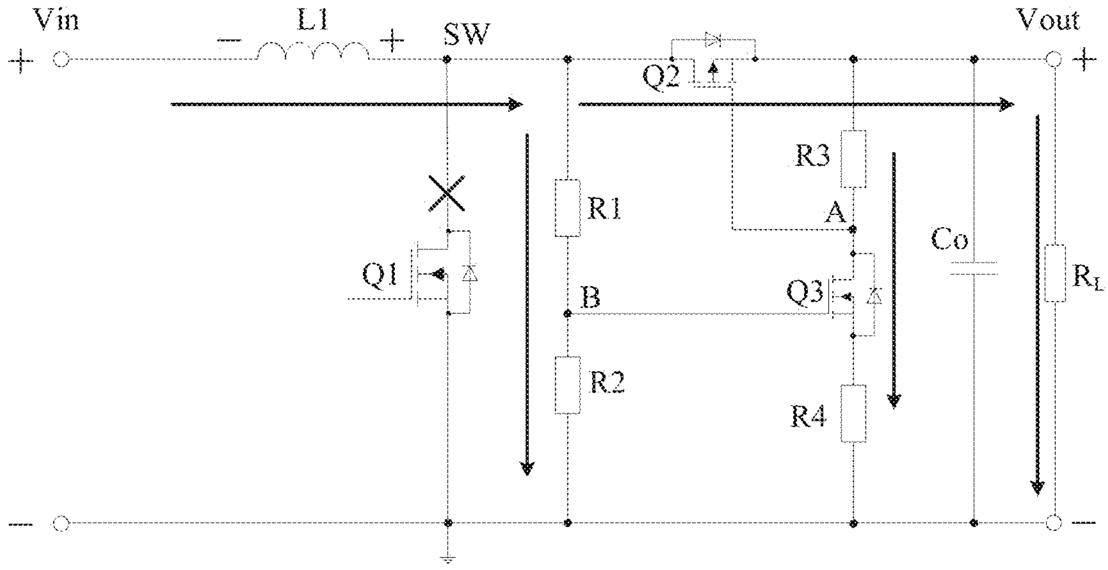
FIG. 4 is a schematic diagram of a current direction corresponding to an inductor discharging stage of the boost switch power supply shown in FIG. 2.

Refer to FIG. 4. Q1 is in an off state. An energy storage current of L1 disappears. Because of a self-inductance characteristic of the inductor L1, a left-negative and right-positive induced voltage VL is generated, and a voltage of the node SW is increased. At the same time, an induced current from left to right is generated in L1, and a direction of the induced current is shown in a direction of an arrow in FIG. 4, preventing the energy storage current from decreasing. At this time, the input power supply Vin, the inductor L1 and the first voltage divider circuit form a closed loop, the induced current of L1 flows through the first voltage divider circuit, and the voltage VB of the node B is increased.

In an example embodiment, Q3 is an NMOS transistor, a source of Q3 is connected to GND, a gate of Q3 is connected to the node B, that is, a voltage difference $V_{GS}$ between the gate and the source of Q2 is VB. When VB is greater than or equal to a threshold voltage value $V_{GSth1}$ of the gate and the source of the NMOS transistor, Q3 is turned on, and $V_{Gsth1}$ is about 0.7 V. That is, after VB is greater than or equal to 0.7 V, Q3 is turned on.

In an example embodiment, Q2 is a PMOS transistor, and is turned on when a voltage difference VGS2 between the gate and the source of the PMOS transistor is greater than or equal to a threshold voltage value $V_{GSth2}$. $V_{GSth2}$ is about −2 V, that is, when a gate voltage of the PMOS transistor is lower than a source voltage by 2 V and above, the PMOS transistor is turned on.

As shown in FIG. 4, the gate of Q2 is connected to the node A, and the source is connected to the positive output end of the switch power supply, that is, the positive electrode of Vout. When Q3 is turned on, the voltage of the node A is pulled down to 0 V, that is, the gate voltage $V_G$ of Q2 is 0 V. At this time, the voltage difference $V_{GS}$ between the gate and the source of Q2 is −Vout, and −Vout is less than $V_{GSth2}$, so that Q2 is triggered to be turned on. The input power supply Vin and the induced voltage VL of the inductor L1 are superposed to supply power to the load $R_L$.

It should be noted that processes of triggering Q2 and Q3 to be turned on is short. After both Q2 and Q3 are turned on, the first voltage divider circuit and the second voltage divider circuit are connected in parallel between the node SW and the ground end GND. Resistance value ratios of R1, R2, R3 and R4 are appropriately configured, to ensure that Q2 and Q3 remain in the on state when Q1 is in the off state.

In an example embodiment, the resistance value ratio of R1 to R2 is about 1:500, a resistance value ratio of R3 to R4 is about 1:4. Specific resistance values of R1 to R4 are not limited provided that the resistance values of R1 to R4 satisfy the above ratio.

When the input voltage Vin=4 V, the output voltage Vout=15 V, and Q2 and Q3 are turned on, a body diode of Q2 has a turn-on voltage drop, so that the voltage of the node SW is about 15.5 V. For example, R1=1 kΩ, R2=510 kΩ, R3=10 kΩ, R4=39 kΩ. The voltages of nodes VA and VB are as follows:

R1 and R2 are connected in series between the node SW and GND, that is, R1 and R2 divide the voltage of the node SW, and a voltage drop VB on R2 is about 15.46 V, that is, the gate voltage of Q3 is about 15.46 V. R3 and R4 divide Vout=15 V, and a voltage drop on R4 is about 12 V, that is, a source voltage of Q3 is about 12 V. Therefore, a voltage difference Vas between the gate and the source of Q3 is about 3.46 V, which is greater than the turn-on threshold 0.7 V of the NMOS transistor, so that Q3 remains the on state.

A turn-on resistance of Q3 is only tens of milliohms, which is negligible compared to the kilo-ohm resistance values of R3 and R4, so that the voltage of the node A is equal to the voltage drop on R4, and is about 12 V, that is, the gate voltage of Q2 is about 12 V. The source voltage of Q2 is the output voltage Vout=15 V, so that the voltage difference Vas between the gate and the source of Q2 is about −3 V, which is greater than the turn-on threshold −2 V of the PMOS transistor. Therefore, Q2 can maintain the on state.

When Q1 is switched from the off state to the on state, the voltage of the node SW becomes 0 V, the voltage difference between the gate and the source of Q3 does not satisfy the turn-on threshold 0.7 V of the NMOS transistor, and therefore Q3 is turned off. Further, after Q3 is turned off, the voltage of the node A becomes Vout, and at this time, the gate voltage of Q2 is equal to the source voltage, so that Q2 is also turned off.

In the boost switch power supply circuit provided in this embodiment, the second switch transistor Q2 is used to replace the diode D1 connected between the inductor and the positive output end. A turn-on impedance of the switch transistor is very small, only tens of milliohms and an output current is usually a few amperes, so that a turn-on voltage drop is reduced from hundreds of millivolts to tens of millivolts. Therefore, after the second switch transistor Q2 is used to replace the diode D1, power loss of the boost switch power supply circuit is greatly reduced, and output efficiency is improved. Moreover, this solution uses the discrete component to form the control circuit to control the on and off states of the second switch transistor Q2, so that when the first switch transistor (that is, the main loop switch transistor) is turned on, the switch transistor is turned off. Therefore, this solution does not need to additionally set a PWM controller, costs of the discrete component are far lower than costs of the PWM controller, reducing hardware costs of the boost switch power supply circuit and simplifying the circuit design.

Figure 5:
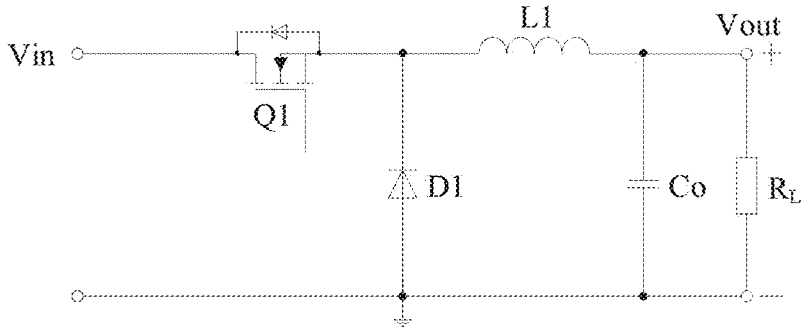
FIG. 5 is a schematic circuit principle diagram of an asynchronous buck circuit.

Similar to the asynchronous boost circuit, an asynchronous buck circuit also has problems of large power loss and low working efficiency. As shown in FIG. 5, two input ends of a switch power supply circuit are connected to one end of an inductor L1 through Q1, and the other end of the L1 is connected to an output end, and a freewheeling diode D1 is reversely connected between a ground end (GND) and a public node of Q1 and L1. An output capacitor Co is connected in parallel to the output end to ensure that an output voltage at the output end is stable, and a load $R_L$ is connected to two ends of Co.

When Q1 is turned on, L1 stores energy and D1 is turned off. When Q1 is turned off, L1 is discharged through D1, and D1 is turned on, but a turn-on voltage drop of D1 is large, which reaches hundreds of millivolts, resulting in large power loss and low output efficiency of the whole switch power supply circuit.

In order to solve problems of large power loss and low output efficiency of a switch power supply based on an asynchronous buck circuit, the inventor of this application provides a switch power supply circuit based on a buck circuit, a switch transistor is used to replace the freewheeling diode D1, and the power loss is reduced. Moreover, a control circuit that includes a discrete component drives the switch transistor to be turned on and off, a PWM controller does not need to be additionally added, hardware costs are reduced, and a circuit design is simplified.

Figure 6:
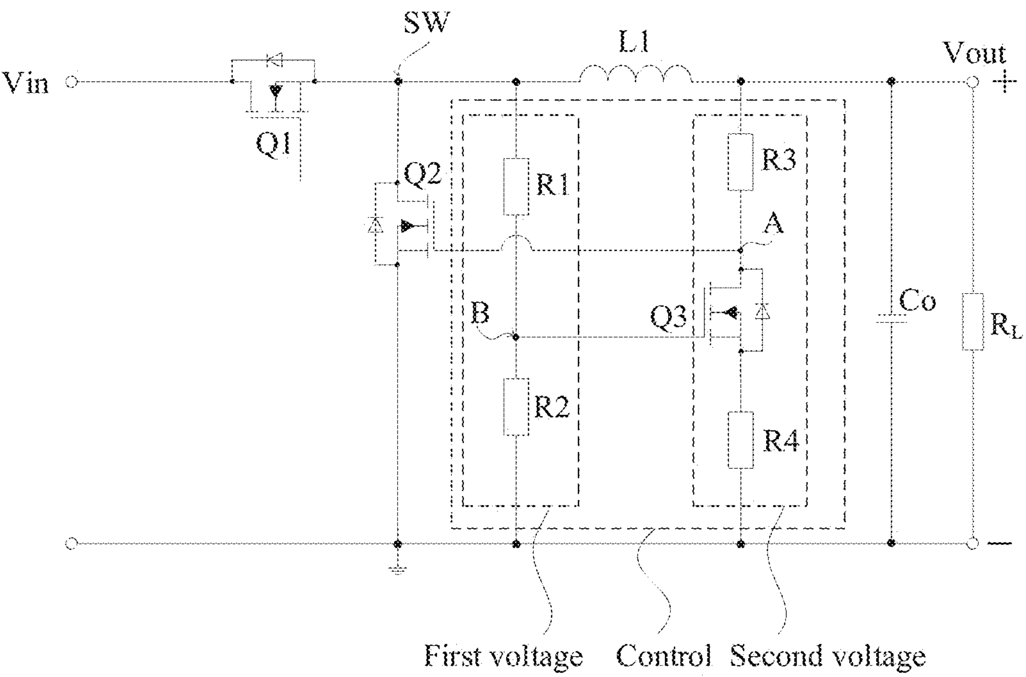
FIG. 6 is a schematic circuit principle diagram of a buck switch power supply according to an embodiment of this application.

As shown in FIG. 6, a buck switch power supply circuit according to an embodiment of this application includes: a first switch transistor Q1, an energy storage inductor L1, a second switch transistor Q2, an output capacitor Co, a load $R_L$, and a control circuit that includes a discrete component. It can be seen that this solution uses the second switch transistor Q2 to replace the freewheeling diode D1 in FIG. 5, and the control circuit that includes the discrete component drives to control Q2 to turn on and turn off.

A first end of Q2 is connected to a second end of Q1, a second end of Q2 is connected to a ground end GND, and a control end is connected to the control circuit.

The output capacitor Co is connected in parallel between two output ends to ensure stability of an output voltage Vout. The load $R_L$ is connected in parallel to two ends of the output capacitor Co.

In an embodiment of this application, the control circuit includes a first voltage divider circuit and a second voltage divider circuit. The second voltage divider circuit includes a third switch transistor Q3.

One end of the first voltage divider circuit is connected to a public node SW of Q1 and L1, and the other end of the first voltage divider circuit is connected to the ground end GND. A middle node (that is, a first middle node) of the first voltage divider circuit is connected to a control end of the third switch transistor Q3. The first voltage divider circuit provides a drive control voltage for Q3 by dividing a voltage of the SW node.

In an example embodiment, the first voltage divider circuit may include at least two voltage divider resistors sequentially connected in series, and the two voltage divider resistors R1 and R2 are used as an example for description. A public node B (that is, the first middle node) of R1 and R2 is connected to the control end of Q3.

One end of the second voltage divider circuit is connected to one end that is of L1 and that is connected to a positive output end, and the other end of the second voltage divider circuit is connected to GND. A middle node (that is, a second middle node) of the second voltage divider circuit is connected to the control end of the second switch transistor Q2. The second voltage divider circuit is configured to provide a drive control voltage to Q2.

The second voltage divider circuit may include at least two voltage divider resistors and a third switch transistor Q3, and two voltage divider resistors R3 and R4 are used as an example. R3, Q3 and R4 are connected in series, one end of R3 is connected to L1 as an end of the second voltage divider circuit, the other end of R3 is connected to a first end of Q3, a second end of Q3 is connected to one end of R4, and the other end of R4 is connected to GND. The public node A (that is, the second node) of Q3 and R3 is connected to the control end of Q2.

In an example embodiment, as shown in FIGS. 6, Q1, Q2 and Q3 each are an NMOS transistor, and the first end, the second end and the control end are sequentially a drain, a source and a gate.

In other embodiments of this application, Q1, Q2 and Q3 may alternatively use other types of switch transistors, which is not limited in this application.

In addition, in other embodiments of this application, there may be more than two voltage divider resistors included in the first voltage divider circuit, and similarly, there may be more than two voltage divider resistors included in the second voltage divider circuit, which is not limited in this application.

A working process of the buck switch power supply according to this embodiment of this application will be described below with reference to FIG. 7 and FIG. 8.

(1) Energy Storage Stage of the Inductor L1

Figure 7:
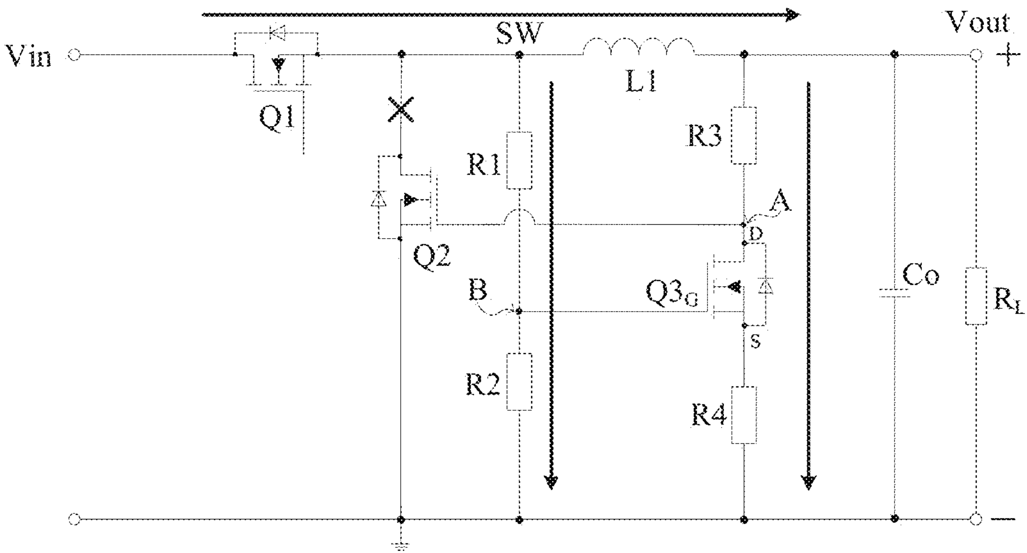
FIG. 7 is a schematic diagram of a current direction corresponding to an inductor energy storage stage of the buck switch power supply shown in FIG. 6.

Refer to FIG. 7. When Q1 is in an on state, the input power supply Vin, the inductor L1, the output capacitor Co and the load $R_L$ form a closed loop. L1 stores energy, a current flowing through the L1 increases linearly, and simultaneously L1 charges the Co to supply power to $R_L$.

Q3 is an NMOS transistor, a source of Q3 is connected to GND through the resistor R4, a gate of Q3 is connected to the node B, and when a voltage difference between the gate and the source of Q3 is greater than a turn-on threshold of the NMOS transistor, about 0.7 V, Q3 is turned on.

After Q1 is turned on, the node SW is at a high level, a current flows in the first voltage divider circuit, and a voltage VB of the node B is a voltage drop on the resistor R2, that is, the high level is greater than the turn-on threshold of the NMOS transistor, so that Q3 is turned on.

After Q3 is turned on, the node A in the second voltage divider circuit is pulled down to a low level, a gate of Q2 is connected to the node A, a source of Q2 is connected to GND, a voltage difference between the gate and the source of Q2 is substantially 0, so that Q2 is turned off.

(2) Discharge Stage of the Inductor L1

Figure 8:
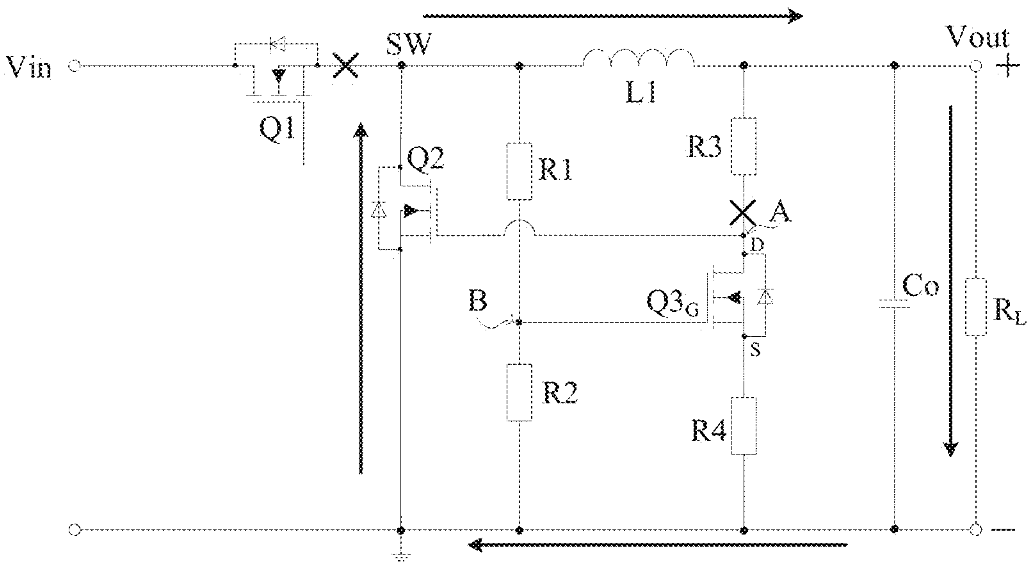
FIG. 8 is a schematic diagram of a current direction corresponding to an inductor discharging stage of the buck switch power supply shown in FIG. 6.

Refer to FIG. 8. When Q1 is in an off state, the node SW is 0 V, at this time, there is no current flowing in the first voltage divider circuit, there is no voltage drop on the resistor R2, and a voltage of the node B is 0 V, so that Q3 is turned off. After Q3 is turned off, there is no current flowing in the second voltage divider circuit. Therefore, a voltage at the node A is equal to a voltage at the positive output end, that is, the node A is at a high level.

The gate of Q2 is connected to the node A, the source is connected to the GND. When Q3 is turned off, the node A is at the high level, and a voltage difference between the gate and the source of Q2 is greater than the turn-on threshold of the NMOS transistor, so that Q2 is turned on.

The inductor L1, the output capacitor Co, the load $R_L$ and the second switch transistor Q2 form a closed loop, L1 discharges through Q2, a current flowing through L1 decreases linearly, and an output voltage is maintained stable through the output capacitor Co and an inductor current.

By appropriately configuring resistance value ratios of R1 to R4, Q2 is turned off when L1 stores energy, and Q2 is turned on when L1 is discharged.

In an example embodiment, the resistance value ratio of R1 to R2 is about 1:3, and the resistance value ratio of R3 to R4 is about 6:1, for example, R1=100 kΩ, R2=330 kΩ, R3=330 k≤2, and R4=51 kΩ. The input voltage Vin=4 V and the output voltage Vout=1.8 V are taken as an example for description.

As shown in FIG. 7, when Q1 is turned on, the voltage of the node SW is equal to the input voltage, which is 4 V, the first voltage divider circuit divides the voltage of the node SW, and the voltage drop on the resistor R2 is 3.07 V, that is, the gate voltage of Q3 is 3.07 V. The source of Q3 is connected to GND through R4, a source voltage of Q3 is approximately 0 V, so that the voltage difference between the gate and the source of Q3 is approximately 3.07 V, which satisfies the turn-on condition of Q3.

After Q3 is turned on, the voltage of the node A is approximately equal to the voltage drop on R4 of about 0.24 V (R3 and R4 divide the output voltage Vout, and the voltage drop on R4 is about 0.24 V). At this time, the voltage difference between the gate and the source of Q2 is about 0.24 V, so that Q2 is turned off. That is, when Q1 is in the on state, Q3 is turned on and Q2 is turned off.

As shown in FIG. 8, when Q1 is turned off, the voltage of the node SW is 0 V, and the voltage of the node B is 0 V, so that Q3 is turned off. After Q3 is turned off, the voltage of the node A is pulled up to the output voltage of 1.8 V by the resistor R3, that is, the gate voltage of Q2 is 1.8 V. The source of Q2 is connected to GND, and the voltage difference between the gate and the source of Q2 is 1.8 V, so that Q2 is turned on. That is, when Q1 is in the off state, Q3 is turned off and Q2 is turned on.

According to the buck switch power supply circuit provided in this embodiment, the second switch transistor Q2 is used to replace the freewheeling diode D1. A turn-on impedance of the switch transistor is very small, only tens of milliohms, and a freewheeling current is usually a few amperes. Therefore, a turn-on voltage drop of Q2 is tens of millivolts, but a turn-on voltage drop of the freewheeling diode D1 is several hundred millivolts. Based on this, after the switch transistor is used to replace the freewheeling diode, the power loss of the buck switch power supply circuit is greatly reduced, and the output efficiency is improved. Moreover, in this solution, the control circuit that includes the discrete component controls the on and off states of the second switch transistor, so that when the first switch transistor is turned on, the second switch transistor is turned off; or when the first switch transistor is turned off, the second switch transistor is turned on. That is, this solution does not need to additionally set a PWM controller, costs of the discrete component are far lower than costs of the PWM controller, so that hardware costs of the buck switch power supply circuit are reduced, and a circuit design is simplified.

In another aspect, an embodiment of this application further provides a terminal device using the foregoing switch power supply circuit. As shown in FIG. 9, the terminal device may include a processor, a memory, a display and a speaker.

It may be understood that the structure shown in this embodiment of this application does not constitute a specific limitation on the terminal device. In some other embodiments, the terminal device may include more or fewer components than those shown in the figure, or some components may be combined, or some components may be split, or components may be arranged in different manners. The components shown in the figure may be implemented in hardware, software, or a combination of software and hardware.

The display is configured to display an image, a video, and the like. The display may be a liquid crystal display (LCD), an organic light-emitting diode (OLED), or the like. When the display is LCD, a backlight power supply of the LCD uses the boost switch power supply or the buck switch power supply provided in the foregoing embodiments.

The speaker is configured to convert an audio electric signal into a sound signal, and the speaker is driven to operate through a power amplifier. In this embodiment of this application, a drive power supply of the power amplifier of the speaker uses the boost switch power supply or the buck switch power supply provided in the foregoing embodiments.

The memory may be configured to store computer-executable program code, and the executable program code includes instructions. The processor runs the instructions stored in the memory, to perform various function applications and data processing of the terminal device.

According to the terminal device provided in this embodiment, the foregoing switch power supply is used as drive power supply of the LCD or the drive power supply of the power amplifier of the speaker in the terminal device, and the switch power supply uses the second switch transistor that replaces a diode. A turn-on impedance of the switch transistor is very small, only tens of milliohms, so that a turn-on voltage drop is reduced from hundreds of millivolts to tens of millivolts, power loss of the switch power supply circuit is greatly reduced, and output efficiency is improved. Moreover, this solution uses a discrete component to form a control circuit to control a switch status of the second switch transistor without additionally setting a PWM controller, costs of the discrete component are far lower than costs of the PWM controller, reducing hardware costs of a switch power supply and simplifying a circuit design.

Based on the descriptions of the implementations, a person skilled in the art may clearly understand that for the purpose of convenient and brief descriptions, division into the foregoing functional modules is merely used as an example for descriptions. During actual application, the functions may be allocated to different functional modules for implementation based on a requirement. In other words, an inner structure of an apparatus is divided into different functional modules to implement all or some of the functions described above. For a detailed working process of the foregoing system, apparatus, and units, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the modules or the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separate, and components displayed as units may or may not be physical units, and may be at one position, or may be distributed on a plurality of network units. Some or all of the units may be selected based on actual requirements to achieve the objectives of solutions of embodiments.

In addition, functional units in embodiments may be integrated into one processing unit, and each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of embodiments essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) or a processor to perform all or some of the steps of the methods described in the embodiments. The foregoing storage medium includes any medium that can store program code such as a flash memory, a removable hard disk, a read-only memory, a random access memory, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

The invention claimed is:

1. A boost switch power supply circuit, comprising:

a first inductor;

a first switch transistor;

a second switch transistor;

a control circuit; and an output capacitor;

wherein:

one end of the first inductor is connected to a positive input end of the boost switch power supply circuit, and a second end of the first inductor is connected to a first end of the first switch transistor;

a second end of the first switch transistor is connected to ground, and a control end of the first switch transistor is connected to a drive signal controller;

a first end of the second switch transistor is connected to a public node of the first inductor and the first switch transistor, a second end of the second switch transistor is connected to a positive output end of the boost switch power supply circuit, and a control end of the second switch transistor is connected to the control circuit;

the control circuit comprises a first voltage divider circuit and a second voltage divider circuit, and the control circuit outputs a control signal for controlling a switch status of the second switch transistor;

the first voltage divider circuit is connected in parallel between the first end of the first switch transistor and the second end of the first switch transistor;

the second voltage divider circuit is connected between the second end of the second switch transistor and the ground, the second voltage divider circuit comprises at least two resistors connected in series, a third switch transistor is connected in series between the at least two resistors, a first end of the third switch transistor is connected to the control end of the second switch transistor, and a control end of the third switch transistor is connected to a middle node of the first voltage divider circuit; and the output capacitor is connected in parallel between the positive output end and the ground.

2. The boost switch power supply circuit according to claim 1, wherein the first voltage divider circuit comprises at least two resistors connected in series.

3. The boost switch power supply circuit according to claim 2, wherein the first voltage divider circuit comprises a first resistor and a second resistor connected in series, and a public node of the first resistor and the second resistor is the middle node of the first voltage divider circuit.

4. The boost switch power supply circuit according to claim 1, wherein the second voltage divider circuit comprises a third resistor and a fourth resistor connected in series, and the third switch transistor is connected in series between the third resistor and the fourth resistor; and wherein a first end of the third switch transistor is connected to the third resistor, a second end of the third switch transistor is connected to the fourth resistor, a control end of the third switch transistor is connected to the middle node of the first voltage divider circuit, and the first end of the third switch transistor is further connected to the control end of the second switch transistor.

5. The boost switch power supply circuit according to claim 1, wherein each of the first switch transistor, the second switch transistor, and the third switch transistor is a metal-oxide-semiconductor field-effect transistor (MOSFET); and wherein for each of the first switch transistor, the second switch transistor, and the third switch transistor, the first end is a drain of the MOSFET, the second end is a source of the MOSFET, and the control end is a gate of the MOSFET.

6. The boost switch power supply circuit according to claim 5, wherein each of the first switch transistor and the third switch transistor is an NMOS transistor, and the second switch transistor is a PMOS transistor.

7. A buck switch power supply circuit, comprising:

a first inductor;

a first switch transistor;

a second switch transistor;

a control circuit; and an output capacitor;

wherein:

a first end of the first switch transistor is connected to a positive input end of the buck switch power supply circuit, a second end of the first switch transistor is connected to one end of the first inductor, and a control end of the first switch transistor is connected to a drive signal controller;

a second end of the first inductor is connected to a positive output end of the buck switch power supply circuit;

a first end of the second switch transistor is connected to a first public node of the first switch transistor and the first inductor, a second end of the second switch transistor is connected to ground, and a control end of the second switch transistor is connected to the control circuit;

the control circuit comprises a first voltage divider circuit and a second voltage divider circuit, and the control circuit outputs a control signal for controlling a switch status of the second switch transistor;

the first voltage divider circuit is connected in parallel between the first end of the second switch transistor and the second end of the second switch transistor;

the second voltage divider circuit is connected between the second end of the first inductor and the ground, the second voltage divider circuit comprises at least two resistors connected in series, a third switch transistor is connected in series between the at least two resistors, a first end of the third switch transistor is connected to the control end of the second switch transistor, and a control end of the third switch transistor is connected to a middle node of the first voltage divider circuit; and the output capacitor is connected in parallel between the positive output end and the ground.

8. The buck switch power supply circuit according to claim 7, wherein the first voltage divider circuit comprises a first resistor and a second resistor; and wherein a public node of the first resistor and the second resistor is the middle node of the first voltage divider circuit.

9. The buck switch power supply circuit according to claim 7, wherein the second voltage divider circuit comprises a third resistor and a fourth resistor connected in series, and the third switch transistor is connected in series between the third resistor and the fourth resistor; and wherein a first end of the third switch transistor is connected to the third resistor, a second end of the third switch transistor is connected to the fourth resistor, a control end of the third switch transistor is connected to the middle node of the first voltage divider circuit, and the first end of the third switch transistor is further connected to the control end of the second switch transistor.

10. The buck switch power supply circuit according to claim 7, wherein each of the first switch transistor, the second switch transistor, and the third switch transistor is a metal-oxide-semiconductor field-effect transistor (MOSFET); and wherein for each of the first switch transistor, the second switch transistor, and the third switch transistor, the first end is a drain of the MOSFET, the second end is a source of the MOSFET, and the control end is a gate of the MOSFET.

11. The buck switch power supply circuit according to claim 10, wherein each of the first switch transistor, the second switch transistor, and the third switch transistor is an NMOS transistor.

12. A terminal device, comprising:

a boost switch power supply circuit; and a to-be-powered device, wherein the to-be-powered device comprises a speaker power amplifier or a liquid crystal display (LCD) backlight device, and wherein the boost switch power supply circuit is configured to supply power to the to-be-powered device;

wherein the boost switch power supply circuit comprises a first inductor, a first switch transistor, a second switch transistor, a first control circuit, and a first output capacitor;

wherein one end of the first inductor is connected to a positive input end of the boost switch power supply circuit, and a second end of the first inductor is connected to a first end of the first switch transistor;

wherein a second end of the first switch transistor is connected to ground, and a control end of the first switch transistor is connected to a drive signal controller;

wherein a first end of the second switch transistor is connected to a public node of the first inductor and the first switch transistor, a second end of the second switch transistor is connected to a positive output end of the boost switch power supply circuit, and a control end of the second switch transistor is connected to the first control circuit;

wherein the first control circuit comprises a first voltage divider circuit and a second voltage divider circuit, and the first control circuit outputs a control signal for controlling a switch status of the second switch transistor;

wherein the first voltage divider circuit is connected in parallel between the first end of the first switch transistor and the second end of the first switch transistor;

wherein the second voltage divider circuit is connected between the second end of the second switch transistor and the ground, the second voltage divider circuit comprises at least two resistors connected in series, a third switch transistor is connected in series between the at least two resistors, a first end of the third switch transistor is connected to the control end of the second switch transistor, and a control end of the third switch transistor is connected to a middle node of the first voltage divider circuit; and wherein the first output capacitor is connected in parallel between the positive output end and the ground.

13. The terminal device according to claim 12, wherein the first voltage divider circuit comprises at least two resistors connected in series.

14. The terminal device according to claim 13, wherein the first voltage divider circuit comprises a first resistor and a second resistor connected in series, and a public node of the first resistor and the second resistor is the middle node of the first voltage divider circuit.

15. The terminal device according to claim 12, wherein the second voltage divider circuit comprises a third resistor and a fourth resistor connected in series, and the third switch transistor is connected in series between the third resistor and the fourth resistor; and wherein a first end of the third switch transistor is connected to the third resistor, a second end of the third switch transistor is connected to the fourth resistor, a control end of the third switch transistor is connected to the middle node of the first voltage divider circuit, and the first end of the third switch transistor is further connected to the control end of the second switch transistor.

16. A terminal device, comprising:

a buck switch power supply circuit; and a to-be-powered device, wherein the to-be-powered device comprises a speaker power amplifier or a liquid crystal display (LCD) backlight device, and wherein the buck switch power supply circuit is configured to supply power to the to-be-powered device;

wherein the buck switch power supply circuit comprises a second inductor, a fourth switch transistor, a fifth switch transistor, a second control circuit, and a second output capacitor;

wherein a first end of the fourth switch transistor is connected to a positive input end of the buck switch power supply circuit, a second end of the fourth switch transistor is connected to one end of the second inductor, and a control end of the fourth switch transistor is connected to a drive signal controller;

wherein a second end of the second inductor is connected to a positive output end of the buck switch power supply circuit;

wherein a first end of the fifth switch transistor is connected to a first public node of the fourth switch transistor and the second inductor, a second end of the fifth switch transistor is connected to ground, and a control end of the fifth switch transistor is connected to the second control circuit;

wherein the second control circuit comprises a third voltage divider circuit and a fourth voltage divider circuit, and the second control circuit outputs a control signal for controlling a switch status of the fifth switch transistor;

wherein the third voltage divider circuit is connected in parallel between the first end of the fifth switch transistor and the second end of the fifth switch transistor;

wherein the fourth voltage divider circuit is connected between the second end of the second inductor and the ground, the fourth voltage divider circuit comprises at least two resistors connected in series, a sixth switch transistor is connected in series between the at least two resistors, a first end of the sixth switch transistor is connected to the control end of the fifth switch transistor, and a control end of the sixth switch transistor is connected to a middle node of the third voltage divider circuit; and wherein the second output capacitor is connected in parallel between the positive output end and the ground.

17. The terminal device according to claim 16, wherein the third voltage divider circuit comprises a fifth resistor and a sixth resistor; and wherein a public node of the fifth resistor and the sixth resistor is the middle node of the third voltage divider circuit.

18. The terminal device according to claim 16, wherein the fourth voltage divider circuit comprises a seventh resistor and a eighth resistor connected in series, and the sixth switch transistor is connected in series between the seventh resistor and the eighth resistor; and wherein a first end of the sixth switch transistor is connected to the seventh resistor, a second end of the sixth switch transistor is connected to the eighth resistor, a control end of the sixth switch transistor is connected to the middle node of the third voltage divider circuit, and the first end of the sixth switch transistor is further connected to the control end of the fifth switch transistor.

19. The terminal device according to claim 16, wherein each of the fourth switch transistor, the fifth switch transistor, and the sixth switch transistor is an NMOS transistor.

* * * * *